United States Patent [19]

Arendt et al.

[11] Patent Number: 5,445,841
[45] Date of Patent: Aug. 29, 1995

[54] METHOD FOR THE EXTRACTION OF OILS FROM GRAIN MATERIALS AND GRAIN-BASED FOOD PRODUCTS

[75] Inventors: Phillip S. Arendt, Chaska, Minn.; Charles E. Langley, Jennings, La.

[73] Assignee: Food Sciences, Inc., Jennings, La.

[21] Appl. No.: 12,118

[22] Filed: Feb. 1, 1993

Related U.S. Application Data

[63] Continuation-in-part of Ser. No. 901,350, Jun. 19, 1992, abandoned.

[51] Int. Cl.[6] ............................................. C11B 1/00
[52] U.S. Cl. ................................. 426/312; 426/417; 426/442; 426/450; 426/489; 426/507; 554/9; 554/13
[58] Field of Search ............... 426/445, 417, 442, 312, 426/621, 618, 626, 425, 430, 492, 489, 507, 447, 449, 450; 554/9, 13, 17; 99/80, 153; 55/50, 17

[56] References Cited

U.S. PATENT DOCUMENTS

| | | | |
|---|---|---|---|
| 2,448,729 | 9/1948 | Ozai-Durrani | 99/80 |
| 2,538,007 | 1/1951 | Kester | 99/153 |
| 2,727,914 | 12/1955 | Gastrock et al. | 260/412.4 |
| 2,829,055 | 4/1958 | Ozai-Durrani | 99/80 |
| 3,261,690 | 7/1966 | Wayne | 99/80 |
| 3,271,160 | 9/1966 | Kopas et al. | 99/2 |
| 3,649,294 | 3/1972 | Thijssen | 99/18 |
| 3,650,763 | 3/1972 | Touba | 426/447 |
| 3,852,504 | 12/1974 | Mihara et al. | 426/373 |
| 3,867,416 | 2/1975 | Barnes | 260/41.8 |
| 3,966,982 | 6/1976 | Becker et al. | 426/430 |
| 4,008,210 | 2/1977 | Steele et al. | 426/430 |
| 4,083,836 | 4/1978 | Anjou | 260/123.5 |
| 4,104,290 | 8/1978 | Koslowsky | 426/429 |
| 4,353,837 | 10/1982 | Barns | 260/412.4 |
| 4,376,073 | 3/1983 | Farmer | 260/123.5 |
| 4,486,353 | 12/1984 | Matsuzaki et al. | 260/412.4 |
| 4,808,426 | 2/1989 | Strop et al. | 426/417 |
| 4,888,180 | 12/1989 | Wu | 426/445 |
| 5,035,910 | 7/1991 | Jones et al. | 426/478 |
| 5,047,254 | 9/1991 | Lee | 426/417 |
| 5,069,923 | 12/1991 | Hubbard et al. | 426/445 |
| 5,077,071 | 12/1991 | Strop | 426/417 |
| 5,091,116 | 2/1992 | Krishnamurthy et al. | 260/409 |
| 5,138,075 | 8/1992 | Ohgaki et al. | 549/413 |
| 5,209,940 | 5/1993 | Champagne et al. | 426/320 |

FOREIGN PATENT DOCUMENTS

| | | |
|---|---|---|
| 0290156A2 | 11/1988 | European Pat. Off. . |
| 326622 | 8/1989 | European Pat. Off. . |
| 2022725 | 8/1970 | France . |
| 2278397 | 2/1976 | France . |
| 1466479 | 3/1977 | United Kingdom . |
| 2052551 | 1/1981 | United Kingdom . |
| WO9117985 | 11/1991 | WIPO . |

OTHER PUBLICATIONS

Bulley, N. R., et al., "Supercritical Fluid Extraction of Vegetable Oil Seeds," J. Am. Oil Chem. Soc., vol. 61, No. 8, pp. 1362-1365 (Aug. 1984).

Gulbaran Tulbentci, H. S., "Extraction of Rapeseed, Linseed, Safflowerseed and Tobaccoseed with a New Laboratory Extractor," J. Am. Oil Chem. Soc., vol. 63, No. 11, pp. 1465-1469 (Nov. 1986).

Kim, C. J., et al., "Comparison of Solvent Extraction Characteristics of Rice Bran Pretreated by Hot Air Drying, Steam Cooking and Extrusion," J. Am. Chem. Soc., vol. 64, No. 4, pp. 514-416 (Apr. 1987).

Abstract of Soviet Union Publication No. 988,860, dated Jan. 15, 1983.

Abstract of Soviet Union Publication No. 973,602, dated Nov. 15, 1982.

Primary Examiner—Donald E. Czaja
Assistant Examiner—Anthony Weier
Attorney, Agent, or Firm—Conley, Rose & Tayon

[57] ABSTRACT

A method of obtaining oil from grain materials such as rice bran, wheat mill feed, rapeseed, amaranth, and similar grains, by stabilizing the oil contained in the grain material (when necessary) while increasing the porosity of such grain material; extracting oil from the grain material by contact with a solvent in vapor form; and, separating extracted oil/solvent compositions into fractions containing various amounts of saturated and unsaturated oils. A solvent in vapor form is also used to remove oils from: previously-extracted oil seeds, which were extracted using a less efficient extraction method; flaked or crushed vegetable matter; and grain-based food products such as chips, crackers and noodles.

4 Claims, 7 Drawing Sheets

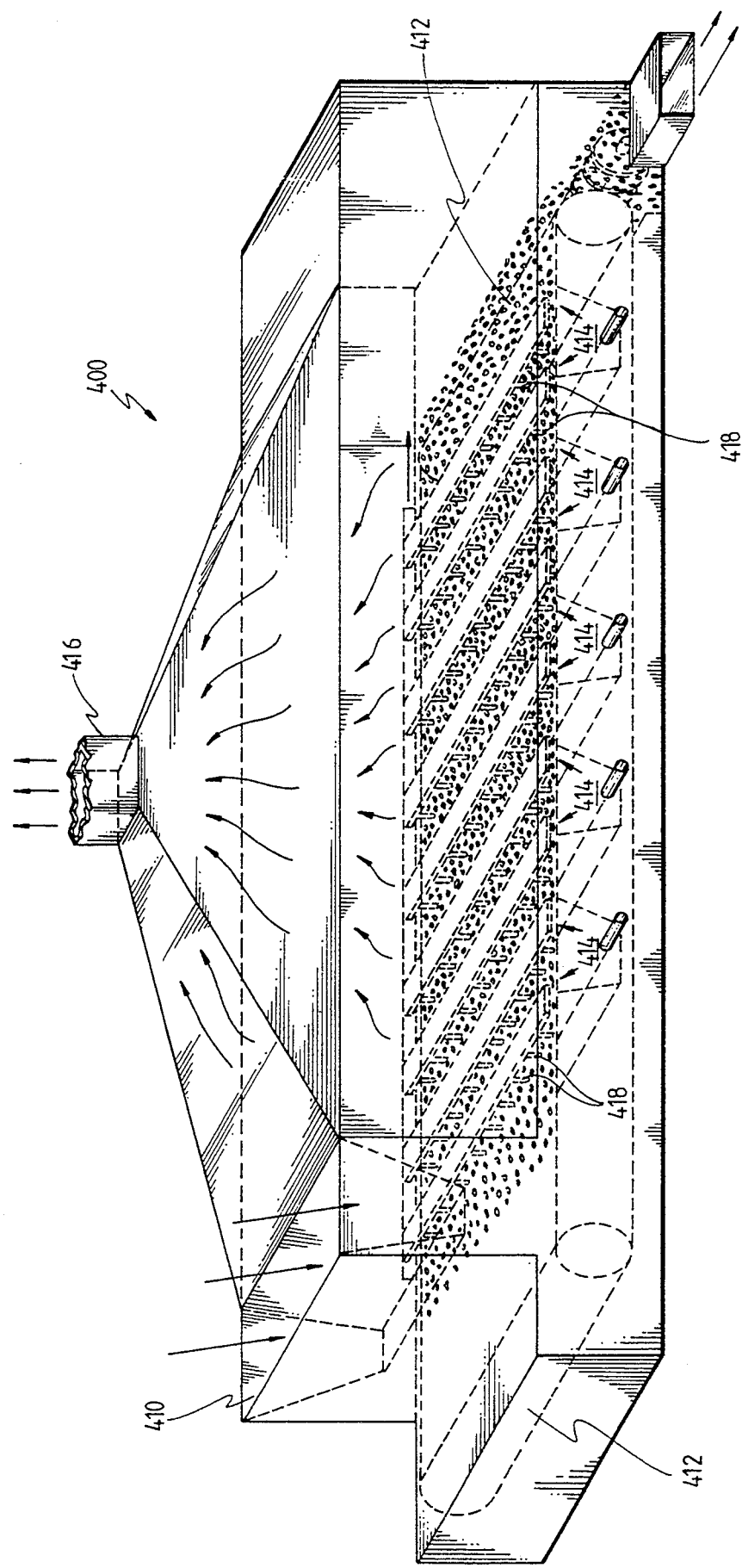

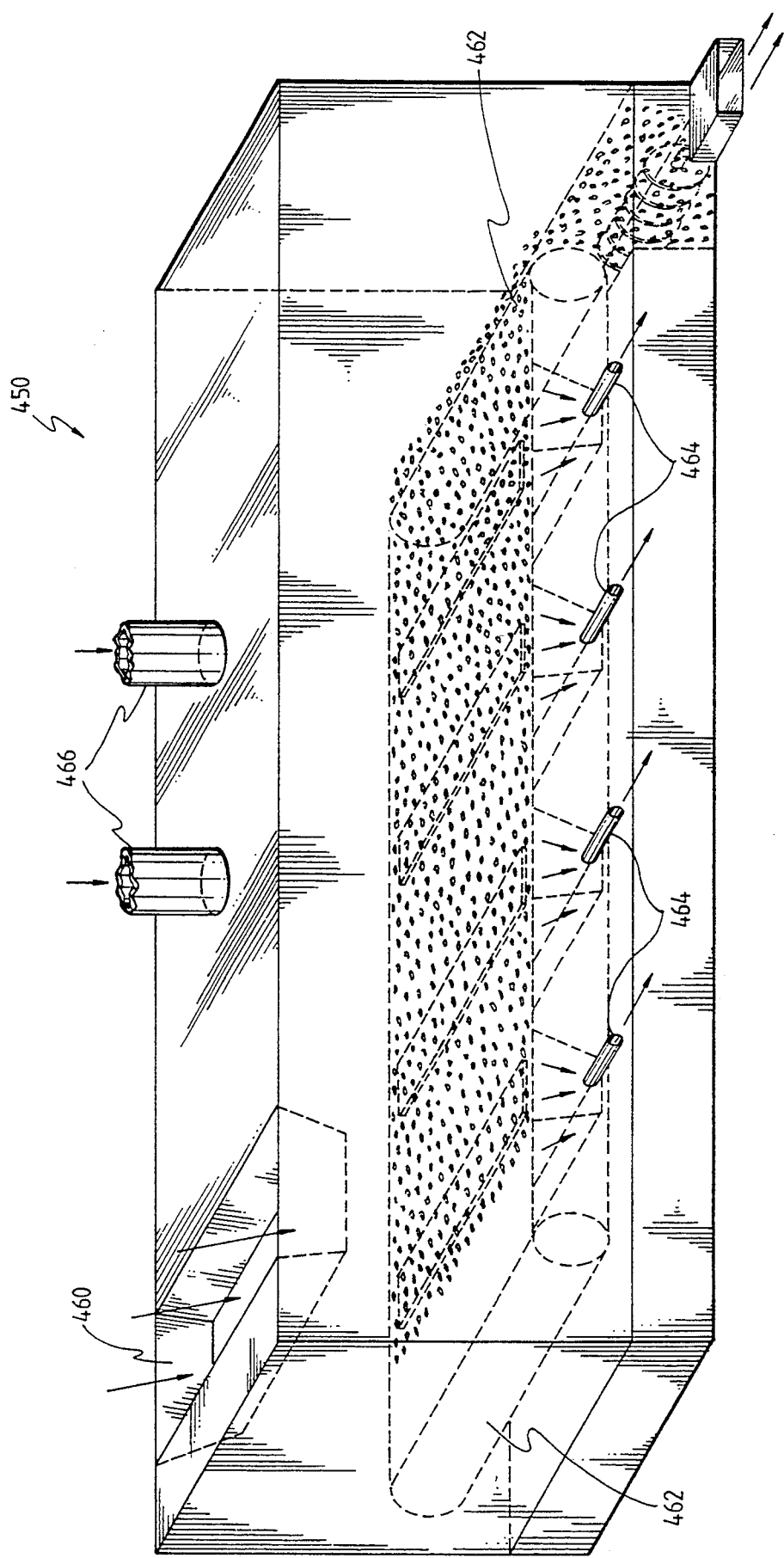

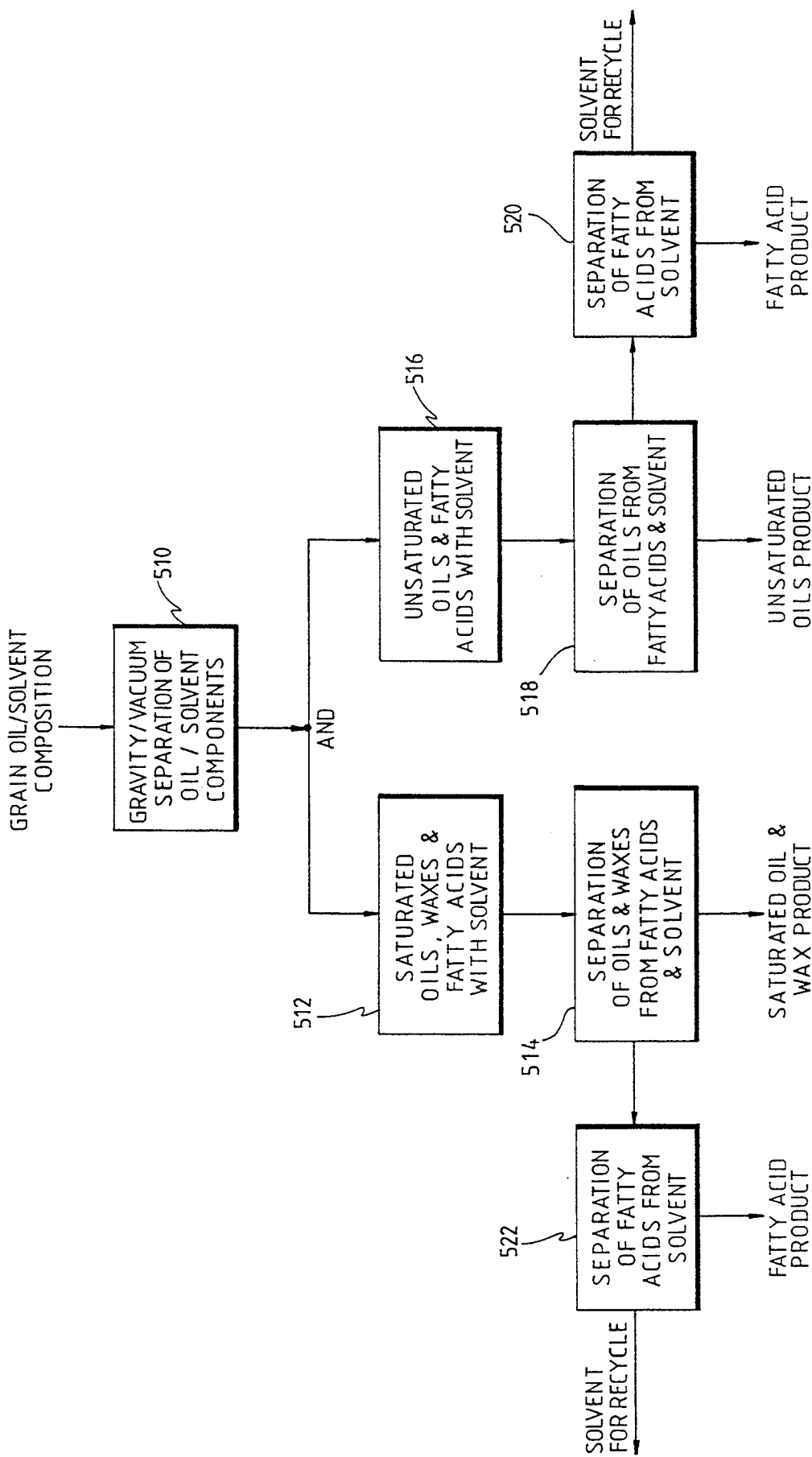

METHOD FOR THE EXTRACTION OF OILS FROM GRAIN MATERIALS AND GRAIN-BASED FOOD PRODUCTS

This application is a continuation-in-part of U.S. Application, Ser. No. 07/901,350, filed Jun. 19, 1992, now abandoned.

BACKGROUND OF THE INVENTION

1. Field of the Invention

This invention pertains to a process for the extraction of oils from grain materials such as rice bran, wheat mill feed, rapeseed, amaranth and similar grains. The process not only provides a method of oil extraction, but provides for the separation of saturated from unsaturated oils. A specially designed apparatus is used to achieve this separation. Use of the process not only provides the extracted oil, but also enables production of a number of grain products having low residual oil contents, which products have particularly desirable food and feed characteristics.

The process for oil extraction applicable grain materials can also be applied to crushed or flaked vegetable matter and to grain-based food products which are somewhat porous, such as chips, noodles and crackers.

2. Background of the Invention

It is known that the best and easiest oilseed to process is soy bean. Rapeseed have also been processed on the kind of equipment used to process soy bean; however, they have been ground, cooked, and rolled into flakes to provide an extractable bed. Generally rapeseed flakes can be run only at a much slower rate than soy beans. The resultant rapeseed and rapeseed residual material after oil removal, called "Marc", cannot readily be used as meals for animal feeding due to the presence of trypsin inhibitors, high euric acid and high glucosinolates.

The process and apparatus of the present invention can be used to process oil seeds such as soy bean and safflower; however, the process was designed particularly for obtaining oil from grain materials such as rice bran, wheat mill feed, rapeseed and amaranth (as well as similar grains). These grain materials do not have as high an oil content as soy bean and safflower and have not been economically competitive as an oil source prior to the present process. Typically, oil seeds contain from about 15 percent to about 40 percent by weight oil. Grains of the kind described above contain only from about 4 percent to about 20 percent by weight oil, and prior to the method of the present invention, processing of grain materials having this low oil content was not competitive with processing of oil seeds. The present oil extraction method makes possible not only the extraction of oil from grain materials, but further extraction of additional oils from crushed or flaked vegetable materials previously oil extracted using a less efficient method of extraction, such as crushed peanuts or olives. The present oil extraction method also enables additional oil extraction from grain-based products such as chips, noodles and crackers, by way of example and not limitation.

In addition to having a lower oil content, the grains frequently require special processing in preparation for oil removal, and when a grain oil source such as rice bran is used, the rice bran itself has a limited shelf life before the oils begin to degrade, due to particularly active enzymes present in the bran. Thus, there are particular handling requirements and processing requirements necessary to enable the use of such grain materials as a source for edible oils.

Most oil seeds are extracted by soaking them in liquid Hexane. The hexane and oil mixture, is called "Miscella". The oil is then separated from the miscella by a process of distillation, and the hexane solvent is recovered for recycle use in the separation process. The Marc which remains after removal of the oil from the seeds is generally a powder and contains substantial amounts, up to about 40 percent, of hexane. The Marc is then "dried" to recover the residual hexane. Recovery of the hexane from the Miscella and from the Marc are both energy intensive processes and require extensive capital equipment.

As previously discussed, rapeseed have been processed on soy bean equipment; they have been ground, cooked and rolled into flakes prior to oil extraction. Even then, the process rate in oil seed processing equipment was marginally cost effective compared with soy bean. Other potential grain material sources of oil include wheat mill feed, amaranth, and rice bran, for example. Wheat mill feed is the material removed from wheat during milling. Twenty percent or more of all the world's wheat ends up as mill feed. Most of this goes into pet food and animal feed. Amaranth, another potential source of oil, known in the midwest as "pig weed", grows wild. The amaranth cultivars, i.e. the plants and hybrids are available to anyone through the U.S.D.A. Wheat mill feed and amaranth can both be extruded into an extractable pellet because they contain sufficient amounts of starch and sugars. The pellets can be processed on standard soy bean equipment, but the hexane solvent typically used for extraction also extracts large quantities of green chlorophyll so that the oil is difficult to refine as well as being dark green, almost black in color. Rice bran requires a particularly specialized process. The rice bran cannot easily be flaked or made into an extrudable pellet because of lack of starch and the presence of sucrose. Rice bran can be extruded if corn starch is added, but the sucrose can caramelize if heated in the presence of air, giving a dark hue to the oil product. Rice bran can be extracted with hexane using an extractor of the type used to process soy beans, but this process is comparatively slow, energy intensive and expensive when compared to soy beans.

There are numerous known apparatus and processes for extracting oil from vegetable matter. Examples of these are described below in references which were uncovered during a review of background art related to the present invention.

U.S. Pat. No. 2,448,729 to A. K. Ozai-Durrani, issued Sep. 7, 1948, describes a method of processing rice bran and rice polish to separate therefrom the valuable vegetable oil content thereof. The rice bran or polish or mixtures of the two is subjected to an agglomeration step immediately, or within a relatively short time interval, after the bran and polish have been removed from the rice grain. The natural sugars, starches and glutens of the rice bran are partially soluble in water and are used to aggregate the material into porous aggregates suitable for oil extraction processes. Typically the aggregate material is extruded into elongated relatively thin strips. The aggregated rice bran or polish in then extracted using a vegetable oil solvent, preferably hexane, under a reduced pressure or in the presence of an inert gas such as nitrogen or carbon dioxide, and at a maximum temperature of about 140° F. to avoid decomposition of the vitamin and food values of the material.

U.S. Pat. No. 2,538,007 to E. B. Kester, issued Jan. 16, 1951, discloses a method for stabilization of brown rice, and particularly for the prevention of rancidity in brown rice. The brown rice, in a hulled condition, consisting of the endosperm, the germ, and the bran layers, is stabilized by extracting the "free oil" (oil which can be extracted without grinding the rice) using a solvent such as benzene, carbon tetrachloride, butane, hexane octane, and mixtures of hydrocarbons such as gasoline, petroleum ether, Stoddard solvent, benzene, naphtha, and other fat-containing solvents.

U.S. Pat. No. 2,727,914 to E. A. Castrock et al., issued Dec. 20; 1955, describes the solvent extraction of rice bran to produce bran oil. In particular, the rice bran is subjected to a mild heat treatment to make the oil more easily extractable. The rice bran particles are cooked while controlling their moisture content so that, at least at an early stage, the particles contain between about 14% to 26% by weight moisture. The cooking temperature is increased from about 170° F. to about 235° F. in the final stage, at which time the moisture content has decreased to between about 6% to about 18%, by weight. The resulting bran particles are then exposed to a relatively cool atmosphere conducive to the evaporation of moisture until they undergo a substantially uniform decrease in temperature to below about 130° F. and a moisture content ranging from about 2% to about 4%. The treated rice bran particles are then mixed with a solvent for rice bran oil and the resulting slurry is filtered to separate the rice bran particles from the miscella. Solvents recommended for extraction include commercial hexanes, methylpentanes and trichloroethylene.

U.S. Pat. No. 2,829,055 to A.K. Ozai-Durrani, issued Apr. 1, 1958, pertains to a method of treating rice paddy or hulled rice grains to remove the rice oils and fats from the bran and polish coatings of the rice. The process for removing the rice oil content of the bran coating on dehulled rice grains comprises immersing the whole grains in a solvent consisting of a low specific gravity petroleum fraction for a time interval at a temperature less than the boiling point of the solvent, to obtain extraction of the significant portion of the rice oil content of the bran coating. In another embodiment of the invention, the removal of the hulls from the rice paddy is accomplished as a sequence of the defatting treatment. The rice paddy is extracted with an organic solvent, and the majority of the solvent, containing oils, is removed. The solvent is removed by drainage, with residual solvent being removed from the rice grains either by vacuum distillation, or by heating the grains to a temperature above the boiling point of the solvent, or by exposing the grains to a current or blast of air. The solvent-containing paddy is then shocked by suddenly increasing the temperature by between about 10° C. and 50° C. to substantially the flash point of the solvent and then igniting the solvent with a flame or spark, to burn the hulls, which fall from the rice kernel, leaving the kernel intact and unbroken.

U.S. Pat. No. 3,261,690 to T. B. Wayne, issued Jul. 19, 1966, relates to improvements in the milling of rice and barley which greatly reduces the breakage of rice grains during the milling. In general, the bran is milled from brown rice in the presence of a solvent effective to extract fatty components from the rice and germ. The bran may be softened with a liquid bran-softening agent used in combination with a volatile organic solvent effective to extract fatty components from the bran and germ. Examples of softening agents include non-toxic oils such as highly refined mineral oils and edible vegetable oils, as well as naturally occurring or synthetic esters of glycerol, propylene glycol, polypropylene glycol or sorbitol with fatty acids. Among preferred extraction solvents are low boiling, highly refined petroleum fractions such as n-hexane and n-heptane. In addition, polar solvents such as alcohols and ethers may be used. Chlorinated hydrocarbons may also be used.

U.S. Pat. No. 3,271,160 to G. A. Kopas et al., issued Sep. 6, 1966 describes a process for preparing feed from undecorticated oil free safflower seed residue. The safflower seeds are crushed or otherwise broken open to get access to the oil inside them, which oil is solvent extracted using known techniques, preferably with hexane. The improvement provided by the invention is that the meat of the residual seed materials, after extraction, can be separated from the hulls by subjecting the relatively dry residual seeds to impact—either pneumatically or by shooting it in an air stream through a gun at a target or mechanically, as in a vertical or horizontal impact mill or similar device. Since the meat particles are fractured more than the hulls, a classification by size alone can be used to separate the products into markedly different protein content compositions.

U.S. Pat. No. 3,852,504 to Mihara et al., issued Dec. 3, 1974, describes a process for complete separation of constituents of rice-bran and the like. All the constituents of seeds and brans of cereal grains, especially rice bran, are recovered by mixing the same with an excess of an aqueous acid solution, pulverizing the mixture, separating an emulsified solution of the dissolved phytin and the protein bonded with the oil dispersed in the acid solution from the solid residue. The solid residue is screened to separate crude fiber-containing substances from a starch-rice fraction.

U.S. Pat. No. 4,808,426 to Strop et al., issued Feb. 28, 1989, describes a process for extraction of vegetable oil from an oil bearing material such as soy bean, corn and the like. The process comprises adding at least one reagent and an oil, of preferably the same type as will be extracted from the oil bearing material, to the oil bearing material to form a slurry mixture. The reagent preferably comprises a reagent for cleaving the chemical bond of the non-hydratable phospholipids, thereby converting the non-hydratable phospholipids into hydratable phospholipids. Typically this reagent is an acid. The slurry is heated at a preselected temperature for a period of time, preferably under a partial vacuum. Subsequently, the resultant oil is extracted from the slurry mixture. This process reduces the phospholipid and trace metal content in the oil extracted from the oil bearing material.

U.S. Pat. No. 4,353,837 to R. W. Barnes, issued Oct. 12, 1982, describes a method for continuous azeotropic processing of vegetable and protein material for the extraction of oil. Particles of oil-bearing protein are continually fed into the top of a vertical column containing perforated plates; the protein particles progress downward in the column while vapor of an oil solvent/water azeotrope progresses up the column. A turbulent miscella pool is formed above the top plate in the column, with a vapor atmosphere of solvent and water being maintained above the pool. Miscella is withdrawn from the pool and the oil is separated therefrom. This patent discloses no specific examples and no particular solvent system is specified for use in the method.

U.S. Pat. No. 5,035,910 to J. D. Jones et al., issued Jul. 30, 1991, pertains to separation of oilseed components in solvent phase. In particular, oilseed, particularly whole Canola ® seed, is separated under non-oxidizing conditions, in a non-aqueous solvent system, into high quality oil and proteinaceous flour food components, and a seed coat meal (hull) byproduct. Maceration in a solvent, sequential liquid cyclone separations, and recovery of components and solvent all take place in completely enclosed liquid flow-through systems with solvent recycle, in a relatively short time. Flaking, cooking and pressing of the Canola ® seed is not required.

U.S. Pat. No. 5,047,254 to T-C Lee, issued Sep. 10, 1991, describes a process for the recovery of edible oil from cereal products. The oil content of rice bran is stabilized by simultaneous high temperature high pressure treatment. Such a treatment also improves the yield obtainable when such oil is extracted from rice bran by solvent extraction. The bran is pretreated prior to extraction of oil by subjecting the bran to 100° C. to 200° C. and at least 500 psi for from 5 to 20 seconds in the absence of added moisture. The pelletized product produced is then extracted using known solvent extraction methods.

U.S. Pat. No. 5,069,923 of E. S. Hubbard et al., issued Dec. 3, 1991, pertains to an apparatus for the processing of grains, and more particularly to a means for expanding raw, whole seed amaranth and extruded half products of cereal grains such as corn, wheat and oats. The expanded or popped grain products are produced in a manner which results in a more nutritious food product that the food product produced by previously-known methods of grain product expansion. The amaranth or other half products of cereals or grains are expanded in a apparatus including: a first container for receiving a food product suitable for expanding; a second container having a wall defining a chamber for the food product, the wall having multiple perforations therethrough, substantially uniform in size and sufficiently small to prevent passage of the unexpanded food product therethrough; and a transfer means for moving the food product from the first container to the second container at a uniform rate. The apparatus also comprises an agitation means in the second chamber for agitating amaranth (the food product) contained in the chamber. Means are also provided for heating air to a temperature sufficient for popping the raw amaranth and for supplying the heated air to the chamber through the perforations, thus to expand at least a substantial portion of the raw amaranth contained in the chamber. Finally, a separating means receives an output of the second container, and separates the expanded amaranth from raw, unpopped amaranth and other matter.

U.S. Pat. No. 5,077,071 to H. R. Strop, issued Dec. 31, 1991, discloses a process for extracting oil from oil-bearing materials, such as vegetable oil bearing seeds and plant materials. The process comprises adding crude oil, water and a reagent to the oil-bearing materials to form a slurry. Subsequently, a resultant oil is extracted from the slurry. The process provides for treating the oil bearing materials in a screw extruder. In addition, the process teaches sparging the slurry with steam to remove impurities contained therein. A substantially toxic-free feed is obtained by maintaining the oil-bearing materials in acid reagents for about 5 minutes to hydrolyze glucosinolates to carbon dioxide and ammonia. The ammonia and carbon dioxide are subsequently stripped therefrom.

U.S. Pat. No. 5,091,116 to R. G. Krishnamurthy et al., issued Feb. 25, 1992, describes an improved method for treatment of edible oils such as soybean oil and cottonseed oil to improve its stability, flavor, and/or to deodorize the oil. The method comprises the steps of: deoxygenating the oil, heating the deoxygenated oil to a temperature in the range of from about 325° F. to about 550° F., continuously conducting the heated, deoxygenated oil through a nitrogen contacting zone and continuously introducing substantially oxygen-free nitrogen in a countercurrent manner through the heated oil at about atmospheric pressure conditions for a time period of at least about 5 minutes and cooling the oil under oxygen excluding conditions to provide a deodorized vegetable oil. A deoxygenated, unsaturated vegetable oil can be blended with a hydrogenation catalyst and contacted with hydrogen to reduce the number of unsaturated bonds of triglyceride components of the oil, while simultaneously deodorizing the oil.

As one can see, looking at the references listed above, there are numerous possibilities for removing oil from vegetable matter and, in particular, from grains. Each of the possibilities has advantages and disadvantages. The present invention provides a very economical method of extracting oil from materials having a low oil content, such as grains, pre-extracted vegetable matter and grain-based food products. Further, the present invention provides a method of separating the extracted oil into at least two fractions, one fraction which contains principally saturated components and at least one other which contains principally unsaturated components. The separation achieved by the method is unexpected in view of the known art and provides a highly desirable oil product, which is low in saturated components.

SUMMARY OF THE INVENTION

In accordance with the present invention, edible oils can be extracted from materials having an oil content of 20% by weight or less in a manner which provides low temperature, low-energy-consumption processing conditions. The materials having an oil content of 20% or less include grain materials, for example, rice bran, wheat mill feed, and rapeseed and amaranth; pre-extracted vegetable matter such as crushed peanuts and olives; and grain-based food products such as chips, crackers and noodles, where the grain product is in a flaked or thin strip form. The method of the present invention can also be applied to grain seeds, vegetable matter and grain-based food products containing more than 20% by weight oil if desired.

The method can provide for the separation of an oil/solvent composition into a principally saturated oil fraction and a principally unsaturated oil fraction. In addition, the resultant extracted grain product is stabilized against degradation while offering valuable food and feed potential.

Granular and seed materials from which oil is to be extracted can be prepared for oil extraction by mechanical size reduction using methods known in the art. Grain materials having a relatively high porosity (in the range of 50% or more internal porosity) typically will not have to be reduced in size prior to oil extraction.

As an alternative to size reduction, feedstock to the oil extraction process can be prepared (and stabilized from degradation where applicable) by the following method: a) moisture content of the material is increased, as necessary, typically to a moisture content ranging from about 6 percent to about 14 percent; b) the material is then heated to a temperature ranging from about 115° F. to about 215° F.; and, c) the surface of the heated material is exposed to a vacuum of about 25 in. Hg absolute or less, preferably less than about 10 in. Hg absolute, and most preferably less than about 4 in. Hg absolute. This treatment of the granular or seed material causes surface rupture due to expanding moisture, providing the necessary and porosity to permit solvent extraction of the contained oils. Further, despite this increase in porosity, applicants have found this treatment of the grain material makes it possible to store such material (even that in which the oil typically degrades rapidly) for extended periods of time, up to several months, without significant change in the overall composition of the oil components within the grain material.

The oils are extracted from prepared grain materials, vegetable matter or grainbased food products using a vaporized solvent for the oils contained therein, which vaporized solvent is not a solvent for the protein in the grain material, vegetable matter or grain-based food product. Applicants have discovered that there is an advantage in using particular vaporized solvents which are capable of forming a weak chemical bond or association with the oil to be extracted. Such solvents permit more rapid oil extraction under milder extraction conditions. This weak bonding or association permits the solvent molecule and the oil molecule to act as one unit for purposes of removing the oil from the grain material, vegetable matter or grain-based food product; however, since the bond or association is weak, the solvent can be subsequently separated from the oil using distillation techniques which make sufficient energy available for breaking the weak bond or association. The oil is extracted by contacting the grain material, vegetable matter or grain-based food product with the vaporized solvent, using a relatively low temperature, ranging from about 100° F. to about 190° F. under a partial vacuum ranging from about atmospheric pressure to about 0.1 in. Hg absolute, depending on the location of the grain material within the oil-extraction apparatus.

The resulting oil/solvent composition can then be processed through a separation means, whereby a saturated oil/solvent fraction is separated from an unsaturated oil/solvent fraction. Each oil/solvent fraction can subsequently be distilled to provide separation of the oil from the solvent.

The preferred solvent for oil extraction by the vaporized solvent process is an acetate such as, for example, methyl acetate or ethyl acetate. Other solvents such as alcohols or organic solvents which are polar in nature and capable of hydrogen bonding or forming associations can also be used. When the extracted oil or Marc is to be used for food or feed, the preferred solvents are food grade solvents, such as ethyl acetate, methanol, ethanol, isopropyl alcohol, hexyl alcohol, heptyl alcohol, or dectyl alcohol, either alone or in various combinations.

The prepared grain material, vegetable matter or the grain-based food product is contacted with an extraction solvent which is in vaporous form. A feedstock which is relatively fracture resistant can be processed using counter current flow of the material to be extracted relative to the extraction solvent vapor. For example, a grain material can be propelled downward in a manner which takes advantage of gravity flow, while the extraction solvent rises upward through the grain material and is collected in the upper portion of the contacting apparatus. In the alternative, the grain material or a more fragile grain-based food product can be moved along a perforated conveyor belt while the vaporized extraction solvent is passed through the grain material. For example, the vaporized solvent can pass from a source beneath the perforated conveyor belt, up through the grain material or grain-based food product and toward a partial vacuum source located above the grain material. The partial vacuum can be created using a flue or using a flue in combination with a condenser. Typically a partial vacuum is used in the upper portion of both kinds of the extraction apparatus described above, to direct a volatile oil/solvent composition to a collection area at that location.

A portion of the extracted oil and solvent typically remains on the surface of the grain material or grain-based food product. There are numerous techniques which can be used to remove this oil/solvent composition from the grain material surface, such as centrifugation, permitting the grain material or grain-based food product to stand so that gravity separation occurs, suctioning the composition from the grain material surface using a vacuum, and combinations of such techniques.

The contacting of a prepared grain material, a flaked vegetable matter, or a grainbased food product with a volatilized extraction solvent is carried out at a volumetric ratio of solvent to grain material ranging from about 3:1 to about 10:1, and preferably at a volumetric ratio of solvent to grain material ranging from about 6:1 to about 8:1. The contacting is carried out in a manner such that the amount of solvent utilized to extract the oil from the grain material ranges from about 0.7:1 to about 5:1 on a weight of solvent: weight of grain material basis. The extracted grain material, flaked vegetable matter or grain-based food product is processed to remove residual solvent and or solvent/oil component using techniques known in the art such as rotary drum drying and vacuum assisted solvent removal techniques. The extracted grain-based food product typically is processed by exposure to vacuum alone or combined with heat, depending on the fragility of the product. The various oil/solvent compositions collected may be stored prior to further processing, or may be fed directly to an apparatus for separating heavier, principally higher molecular weight unsaturated oils from lighter, principally lower molecular weight saturated oils.

The oil/solvent composition is separated into heavier and lighter oils by processing through a specially developed separation apparatus. Typically the oil/solvent composition ranges from about 10 percent oil with 90 percent solvent to about 40 percent oil with 60 percent solvent, on a weight to weight basis. The preferred apparatus for separation is a chamber having at least two volumetric areas comprising packing and having a relatively open (unobstructed) volumetric area between them. A partial vacuum is typically applied principally to the upper packed volumetric area. The oil/solvent product is fed, preferably in a periodic or pulsed manner, into the relatively open volumetric area between the packed volumetric areas. A heavier oil/solvent fraction, comprising principally unsaturated oils having from about 16 to about 24 carbon atoms and particularly having from about 18 to about 24 carbon atoms, is collected in the lower portion of the separation apparatus, while a lighter oil/solvent fraction, comprising principally saturated oils having from about 4 to about 16 carbon atoms, is collected in the upper portion of the separation apparatus. Typically, the average residence time of oil/solvent components in the upper packed volumetric area is less than about 5 minutes and the average residence time of oil/solvent components in the lower packed volumetric area is less than about 2 minutes.

Both the heavier oil/solvent fraction and the lighter oil/solvent fraction are further processed to separate the oil from the solvent, providing at least two oil products and solvent which can be recycled within the process. Typically the separation of oil from solvent is accomplished using distillation techniques known in the art.

The apparatus for stabilizing the oil content of rice bran and for preparing grain materials for oil extraction by rupture of the surface and opening of conduits within the grain material comprises the following elements:

a) a means for increasing the moisture content of the grain material feed stock to at least 6% by weight moisture. Typically the grain material is contacted with water at room temperature and allowed to stand until the water is absorbed and reaches an equilibrium within the grain material. Preferably the moisture content of the grain material is increased so that it ranges between about 12% to about 16% by weight moisture;

b) a means for heating the grain material to a temperature ranging from about 100° F. to about 215° F., depending on the amount of vacuum subsequently applied. Typically the heat is applied using steam to prevent moisture loss from the grain material.

c) a means for applying vacuum to the grain material, whereby the moisture in the grain material expands, to rupture the surface of and create pathways within the grain material which make the oil contained in the grain material accessible to the extraction solvent used to extract the oil. The expanded, porous grain material is then cooled, and can be stored until oil extraction is carried out. The porous grain material can be stored for time periods ranging from a few weeks to a few months depending on storage temperature and humidity conditions. Although it is not necessary to prepare all grain materials for extraction using the above-described method of increasing porosity, this preparation is particularly helpful in the extraction of oil from rapeseed and amaranth. The apparatus used for separation of an extracted oil/solvent composition into a principally unsaturated oil/solvent fraction and a principally saturated oil/solvent fraction comprises the following:

A multi-chambered process vessel having a feed inlet chamber which is a relatively open, unpacked volumetric space and having at least two additional chambers attached to the feed inlet chamber, which additional chambers contain packing of the kind used in the chemical industry in separations processes. The feed inlet chamber may contain baffles or other means for directing entering feed (extracted oil/solvent composition) within the inlet chamber toward attached packed second and third chambers. In addition, the apparatus includes at least one means for applying vacuum to at least one of the chambers of the process vessel. Preferably the process vessel chamber is constructed in the manner of a packed separation column, having a partial vacuum applied to the upper portion of the column, so that gravity can be used to pull heavier molecules toward the bottom of the column while lighter molecules tend to rise toward the upper portion of the column. In a preferred embodiment, the oil/solvent composition, in the form of a vapor, enters the feed inlet (first) chamber through at least one feed stream supply means located within the inlet chamber. In the most preferred embodiment, the feed stream supply means provides a periodic or pulsed feed stream. One means is provided for removing the processed lighter oil/solvent product from a location at or above a packed (second) chamber, and a second means is provided for removing the processed heavier oil/solvent product from a location at or below a packed (third) chamber of the separation apparatus vessel. Typically at least one of the product streams will be a vapor, and means for condensing such vapors is provided. The vaporous product streams withdrawn from the separation apparatus may flow directly to a distillation apparatus for separation of the oil/solvent fraction into an oil product and recycle solvent. Vaporous or condensed product can be withdrawn from any location within the separation apparatus vessel and recycled to any other location within the vessel, to provide the desired product streams. The number of packed chambers and relatively open chambers can be tailored to the desired product. Several separation apparatus can be used in series, or in parallel.

Not only are edible oils produced from the process of the present invention, but numerous products comprising the Marc, residual grain material after oil extraction, are of special interest as valuable food and feed products.

The extracted oils generated from rice bran typically include about 20% by weight light oils, typically saturated fats and waxes, and about 80% by weight heavier oils, typically unsaturated fats and fatty acids. These light and heavier oil components can be separated by the process of the present invention into a principally unsaturated fraction comprising linoleic, linolenic and liconsenic acids and a principally saturated fraction including oleic, stearic and palmitic acids. It is particularly important that the principally unsaturated oil fraction obtained from amaranth and rice bran also contains Vitamin E of the rare alpha type. This type of vitamin E is linked to lowering human cholesterol levels.

A blend of extracted amaranth Marc with extracted, stabilized rice bran Marc provides a specific outstanding feed product which has the amino acid equivalent of soy bean meal. The blend typically ranges from about 80:20 to about 60:40, rice bran Marc: amaranth Marc, on a weight to weight basis. The blend of rice bran Marc with amaranth Marc typically has a total oil content ranging from about 0.5 percent to about 10 percent by weight oil. Additives can be combined with the Marc blend if desired for a particular application. A particularly preferred animal and poultry feed product obtainable using the extraction process of the present invention is a blend of the stabilized rice bran Marc with whole amaranth. The preferred blend comprises a ratio of rice bran Marc to whole amaranth ranging from about 75:25 to about 60:40, on a weight to weight basis. The blend of rice bran Marc with whole amaranth typically has a total oil content ranging from about 2 percent to about 14 percent by weight oil. As previously described, other additives can be combined with the blend if desired.

Another outstanding feed product which can be generated from Marc obtained using the process of the present invention comprises rapeseed Marc and another component selected from the group consisting of rice bran Marc, amaranth Marc, whole amaranth, or mixtures thereof, wherein the weight to weight ratio of rapeseed Marc to the component selected ranges from about 30:70 to about 50:50. This feed product typically has a total oil content ranging from about 0.05 percent by weight to about 14 percent by weight oil.

The grain-based food products such as crackers, noodles and chips which are processed using the oil extraction process of the present invention contain significantly less oil (typically 2–10% by weight than grain-based food products currently marketed.

BRIEF DESCRIPTION OF THE DRAWINGS

FIGS. 4A and 4B show schematics of a preferred apparatus for extraction of oil from grain materials or grain-based food products using an extraction solvent in vapor form. FIG. 4A shows an apparatus comprising perforated conveyor on which the grain material or grain product travels while solvent vapor passes through the grain material or grain-based food product. FIG. 4B shows as apparatus which can be a continuation of the apparatus shown in FIG. 4A or which can be an auxiliary apparatus. In the FIG. 4B apparatus, residual oil/solvent compositions are removed from the surface of the grain material or grain-based food product using a partial vacuum in combination with gravity flow.

FIG. 5 shows a schematic of a preferred embodiment of the method for separation of an extracted oil/solvent composition into a principally saturated oil/solvent fraction and a principally unsaturated oil/solvent fraction. Auxiliary separation of the solvent (for recycle in the oil extraction process) from these components is also illustrated.

DETAILED DESCRIPTION OF THE PREFERRED EMBODIMENTS

In accordance with the present invention, a method is provided for obtaining particular oil compositions from grain materials including, for example, rice bran, wheat mill feed, rapeseed, amaranth, and similar grains. Further, the method provides for separating the extracted oil/solvent composition obtained from the grain materials into principally saturated and principally unsaturated oil fractions. Particular apparatus are described for use in preparation of the grain material for extraction of the oil from the grain material, and for separation of the extracted oil/solvent composition into principally saturated and principally unsaturated oil fractions. In addition to processing of the extracted oil, the grain material residual after oil extraction (Marc) has been further processed and blended into valuable feed and food products, which are also described.

The process for oil extraction applicable to grain materials can also be applied to crushed or flaked vegetable matter and to grain-based food products which are somewhat porous, such as chips, noodles and crackers.

Figure 1:
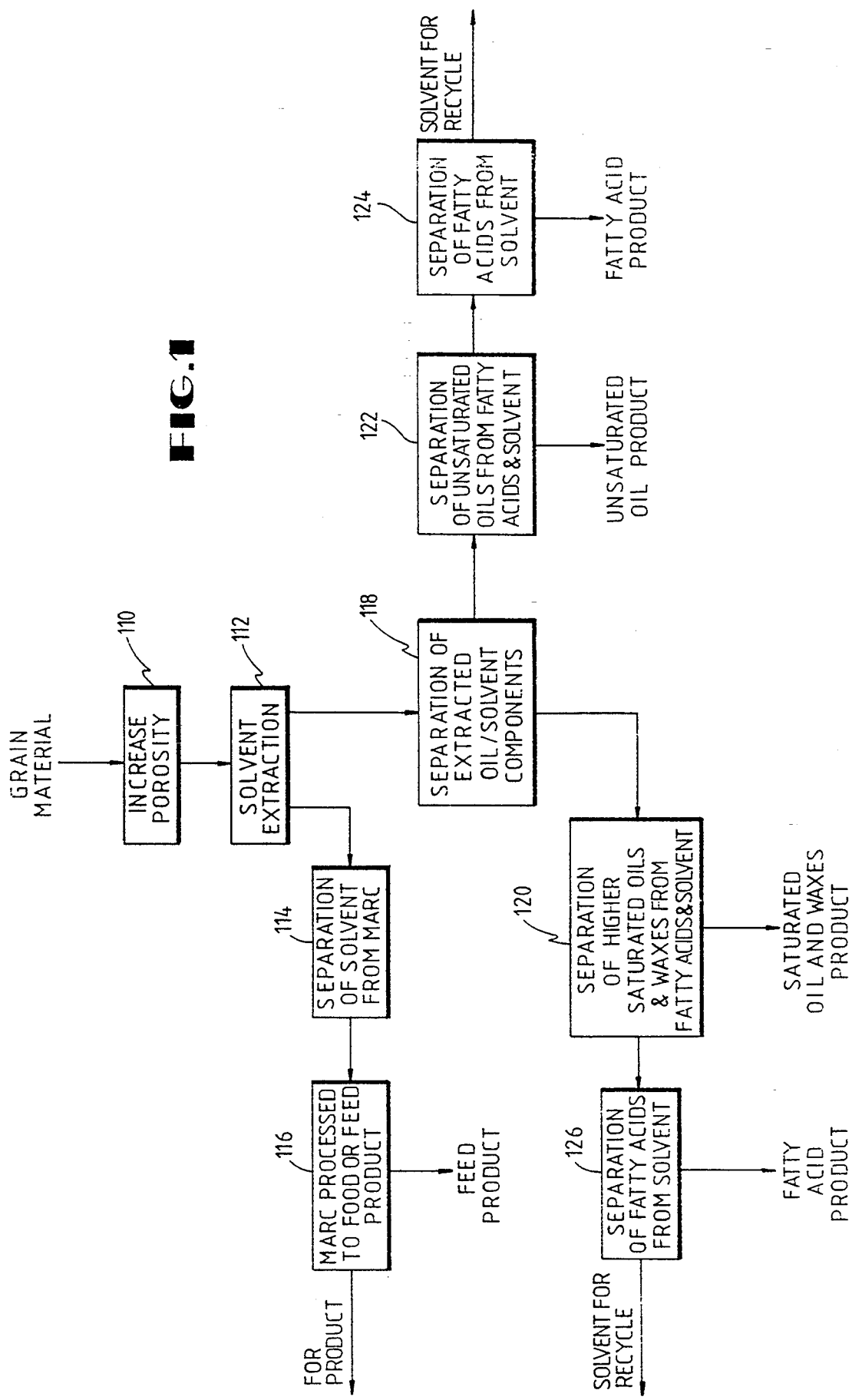
FIG. 1 shows a schematic of a combination of process steps which comprise a preferred embodiment of the method of the present invention. This embodiment includes step 110: preparation of the grain material for oil extraction (increasing porosity of the grain material and in some instances stabilizing the oil content of the grain material); step 112, solvent extraction of the oils from the grain material; step 118, separation of the extracted oil/solvent composition into principally saturated oil/solvent and principally unsaturated oil/solvent fractions; further separation of fatty acids from both the principally unsaturated oil/solvent fraction and the principally saturated oil/solvent fraction as shown in steps 122 and 120, respectively; and, step 114, separation of solvent from the extracted grain material and from the fatty acid/solvent component.

FIG. 1 shows a schematic of a combination of process steps which can be used to obtain particular components from grain materials such as wheat and rice brans and seeds. With reference to FIG. 1, the grain material is made more porous (and the oil stabilized from degradation in some circumstances) in step 110. This optional step can be used to prepare the grain material for more efficient stripping of the oil. The porous grain material is then contacted with solvent vapors in a solvent extraction step 112, whereby the oil is removed from the grain material. The stripped grain material, having the oil extracted, Marc, can then be treated in step 114 to remove the residual solvent, which can be recycled into the stripping operation. The Marc can be further processed in step 116 into a given food or feed product.

The extracted oil/solvent composition can be distilled to provide an oil product and solvent which can be recycled to solvent extraction step 112. However, preferably the extracted oil/solvent composition is processed in step 118 to separate the composition into a principally saturated oil/solvent fraction and a principally unsaturated oil/solvent fraction. The principally saturated oil/solvent fraction, which comprises saturated oils, waxes and fatty acids is separated in step 120 to produce a principally saturated oils and waxes product and a fatty acid/solvent component; the latter component can be subsequently separated in step 126 into a fatty acid product and solvent for recycle into solvent extraction step 112 or into separation step 118. The principally unsaturated oil/solvent fraction, which comprises unsaturated oils and fatty acids, is processed in step 122 (typically distilled) to separate the fatty acids and solvent from the unsaturated oils, providing a principally unsaturated oil product. The fatty acids can be subsequently separated in step 124 from the solvent, providing a fatty acid product and solvent for recycle into solvent extraction step 112 or into separation step 118.

When a grain material such as rice bran is to be processed, and there is the problem of oil degradation during storage, it is advisable to stabilize the rice bran using the moisture/heat/partial vacuum procedure previously described. Rice bran which could be stored (without significant degradation) about 7 days or less without this stabilizing procedure can then be stored from about 2 to about 4 months (depending on temperature and humidity conditions). Thus, if rice bran is to be shipped a considerable distance prior to processing for oil extraction, it is advisable to treat it for stabilization prior to shipment.

The same technique used for rice bran stabilization can be applied to increase porosity of a grain material in preparation for extraction of the oil.

Figure 2:
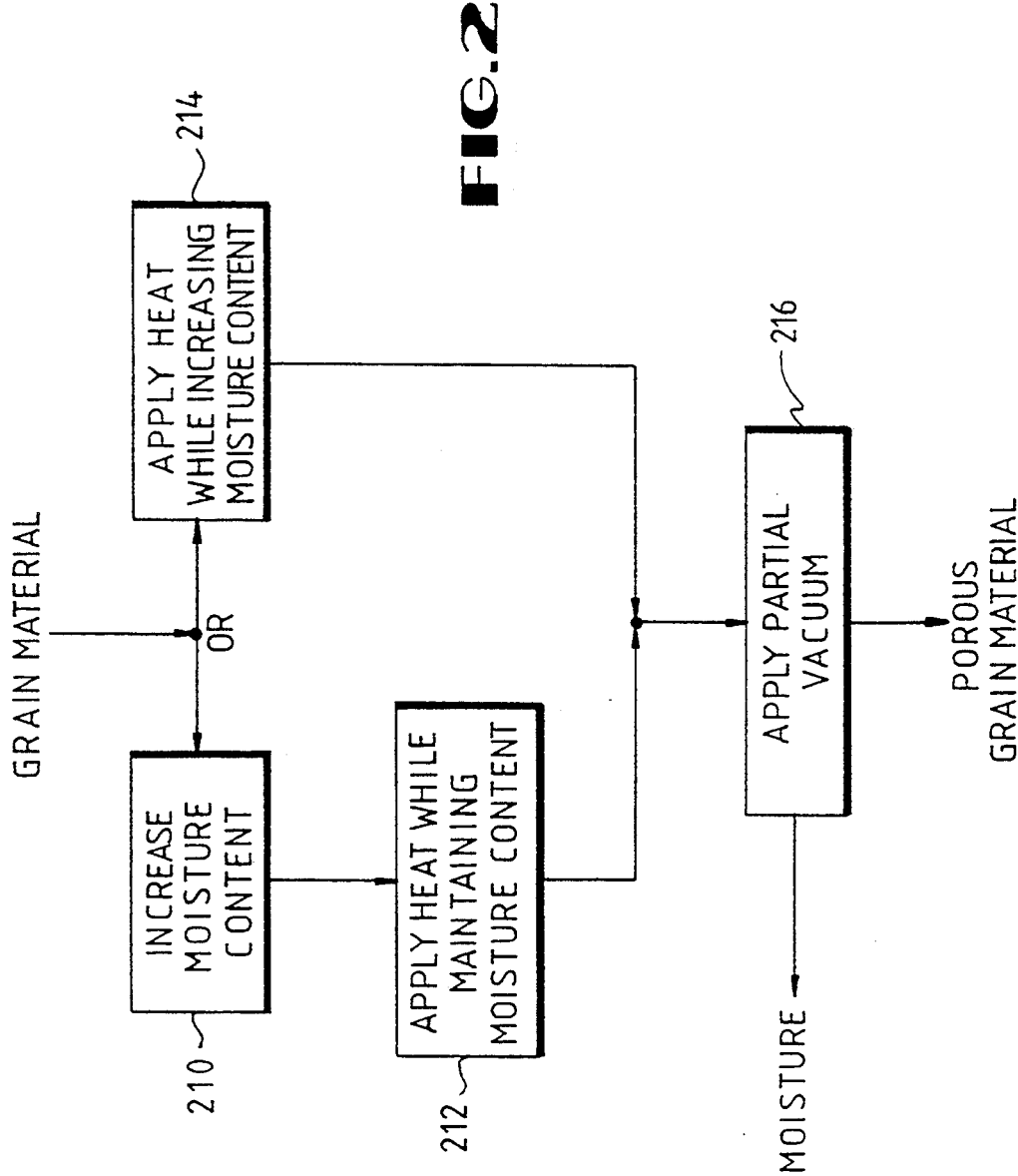
FIG. 2 shows a schematic of a preferred embodiment of the method for preparation of grain material, whereby increased porosity of the grain material is obtained using the moisture content of the grain material under a reduced pressure.

FIG. 2 shows a schematic of the process steps which can be used to make the grain material more porous, enabling extraction of the oil contents via solvent extraction. This combination of process steps can also be used to stabilize the oil content of the grain material when it contains enzymes which may cause degradation of the oil with time. As an alternative to increasing porosity, the grain material may be processed through mechanical size reduction equipment, whereby the availability of the oil for extraction by a solvent contacting the grain material is increased. However, such mechanical size reduction is an energy intensive operation and relatively expensive. The preferred method of making the oil more available for extraction is to create porosity within the grain material using moisture contained within the grain material.

Typically the grain material as received from suppliers contains about 6 percent by weight water (moisture) to about 11 percent by weight moisture. It is preferred to increase this moisture level to range between about 12 percent by weight to about 16 percent by weight to provide effective porosity increasing action. The method of increasing the moisture level in the grain material is dependent on the physical form of the grain material itself; however, typically the moisture content is increased by spraying the grain material with water and allowing the sprayed grain material to stand for about 24 hours at ambient temperature (77° F.) at ambient pressure.

With reference to FIG. 2, the grain material is treated in process step 210 to provide the desired moisture content, then heat is applied in step 212, typically by such means as contacting of the grain material with steam, until the temperature of the grain material ranges between about 100° F. and about 215° F. A partial vacuum, is applied in step 216 to provide an absolute pressure on the surface of the grain material which ranges between about 0.3 in. Hg and about 25 in. Hg at the surface of the heated grain material to cause the moisture in the grain material to expand rapidly, creating porosity within the grain material. The temperature to which the grain material must be heated is dependent on the amount of vacuum applied; one skilled in the art can, with minimum experimentation, determine the optimum conditions for a particular grain material. Typically the grain material is fed through rotating air locks into the upper portion of a chamber which is at the partial vacuum specified above. The grain material falls via gravity into a lower portion of the chamber from which the porous grain material can be fed into the solvent extraction process for the removal of oil or can be cooled and stored for subsequent processing. An alternative method for increasing porosity of the grain material is shown in FIG. 2, step 214, wherein an increase in moisture content is achieved simultaneously with heating of the grain material, using steam contact with the grain material. Subsequently, the heated grain material is exposed to a partial vacuum as shown in step 216.

Figure 3:
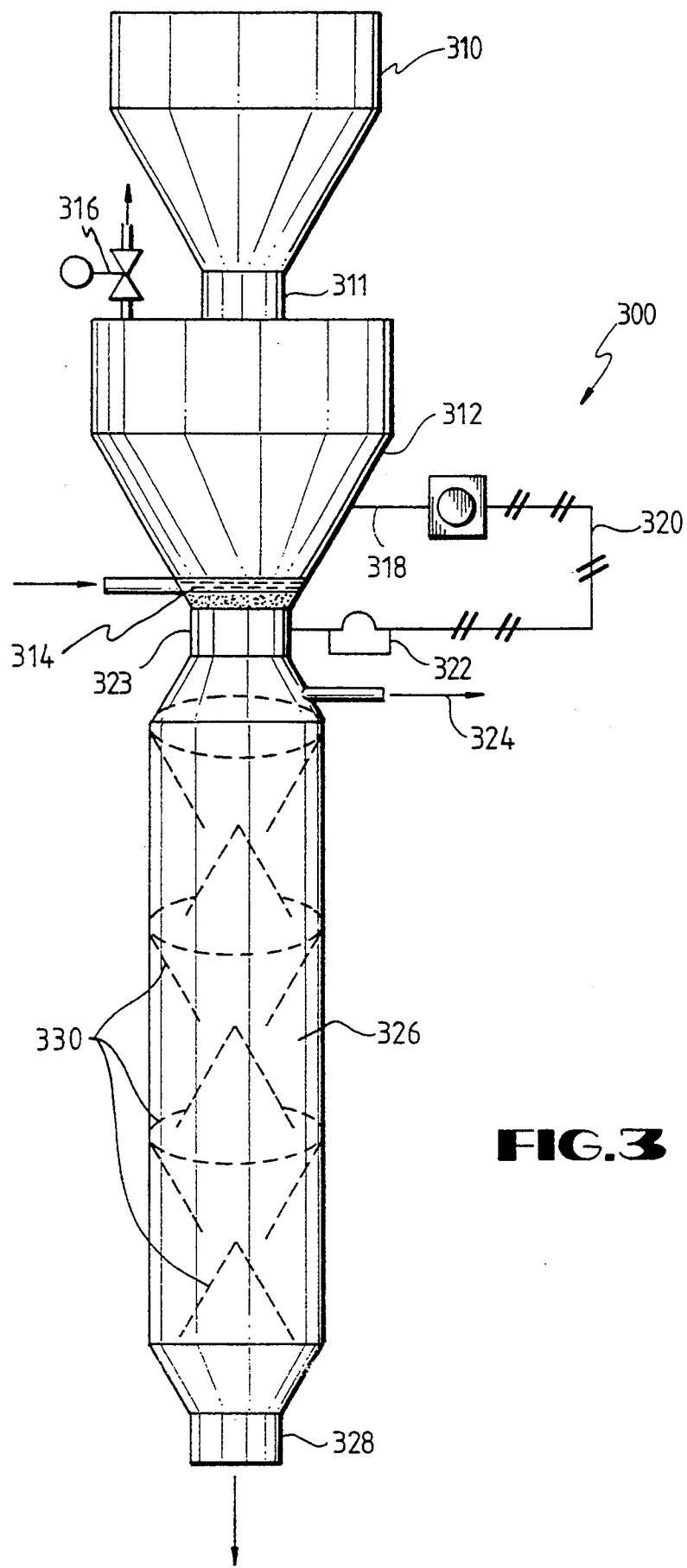
FIG. 3 shows a schematic of a preferred apparatus which can be used for preparation of a grain material prior to solvent extraction, and to stabilize the grain material for storage.

FIG. 3 illustrates one preferred embodiment of an apparatus for increasing the porosity of a grain material prior to solvent extraction of the oil from the grain material. Referring to FIG. 3, the apparatus 300 comprises a hopper 310 to hold the grain product which has been treated to increase the moisture content to at least 6 percent by weight. Preferably the grain material has been treated to a moisture content ranging from about 12 to about 14 percent by weight. Beneath hopper 310 is air lock 311 which enables maintenance of a pressure differential in steam pressure chamber 312. The grain product from hopper 310 passes through air lock 311 into steam pressure chamber 312 where it is heated by steam to a temperature ranging from about 100° F. to about 215° F., without significant decrease in moisture content. Steam is fed into steam pressure chamber 312 through steam distributor 314 and exits chamber 312 through a pressure relief valve 316 located in the upper portion of chamber 312. The grain product is held in chamber 312 until temperature probe 318 indicates that the grain product is at the proper temperature, at which time a controller 322 actuates air lock 323 to permit the grain to pass into vacuum chamber 326 in which expansion of the grain product occurs. Vacuum chamber 326 typically contains baffles 330 to direct the flow of the grain material toward the exit from vacuum chamber 326 through air lock 328. The absolute pressure in vacuum chamber 326 is typically maintained through vacuum line 324, so that the upper portion of vacuum chamber 326 is at an absolute pressure ranging from about 0.3 in. Hg to about 25 in. Hg, while the lower portion of vacuum chamber 326 is at atmospheric pressure. Gravitational force is used to cause the grain product to exit the base of vacuum chamber 326 through air lock 328.

The prepared grain material, processed in one of the manners described above, is then contacted with a solvent to extract the oil content of the grain material. The oil can be extracted by counter-current stripping under vacuum with a solvent in vapor form. For example, the grain material moves downward through a column, via gravity assist, as the stripping solvent vapor moves up the column, drawn up by a partial vacuum applied in the upper portion of the column. The interior of the column can contain various baffle and ring formations to direct the grain material as it flows toward the bottom of the column. In one preferred column design, the column contains a spiralshaped conveyor for the grain material, with an exterior vibrator to help keep the grain material moving downward along the conveyor toward a collection area at the bottom of the column. There are numerous possibilities for transporting the grain material in such a manner that it contacts the solvent vapors for a period of time sufficient to achieve extraction of the desired amount of oil.

A preferred apparatus for use in extraction of oil from a grain material or a grain-based food product is shown in FIG. 4A. Vapor contact extractor 400 is comprised of air lock 410 from which the grain material or grain product enters vapor contact extractor 400. From air lock 410, the grain material or grain-based food product is deposited onto a moving, perforated conveyor belt 412. Extraction solvent vapor 414 flows upward through perforated conveyor belt 412 and through the grain material or grain-based food product conveyed on the surface thereof. General solvent vapors flow toward flue 416 which is used to collect a first solvent-/extracted oil vapor component. Flue 416 leads to a collection vessel (not shown). Typically a condenser (not shown) is used in combination with flue 416 to reduce the volume of the first solvent/extracted oil vapor component and to create a partial vacuum within flue 416. The grain material or grain product on perforated conveyor belt 412 has on its surface a second, liquid solvent/extracted oil component which must be recovered. Various suction techniques or centrifugation can be used to separate this second, liquid solvent/extracted oil component, from a grain material surface. For example, suction tubes 418 can be extended just below the surface of a grain material to remove the second, liquid solvent/extracted oil component which has migrated toward the upper portion of the layer of grain material on perforated conveyor belt 412. In the case of a grain-based food product such as a chip, cracker or noodle, such products are more fragile; and, typically partial vacuum is used in combination with heat to remove the second, liquid solvent/extracted oil component from the surface of such a grain-based food product.

FIG. 4B shows an apparatus for further, continued removal of the second, liquid solvent/extracted oil component from the surface of the grain material or grain-based food product. Oil separation extractor 450 can be a continuation of vapor contact extractor 400 or can be an auxiliary processing apparatus. In the oil separation extractor 450 shown in FIG. 4B, grain material enters air lock 460 and is deposited onto a moving, perforated conveyor belt 462. The second liquid solvent/extracted oil component is separated from the grain material using a partial vacuum applied beneath perforated conveyor belt 462 by vacuum sources 464. Gas, either air or an inert gas such as nitrogen is permitted to enter oil separation extractor 450 through gas intake means 466, to permit proper operation of the partial vacuum draw upon the grain material. An inert gas is used when the presence of oxygen would alter the oil product obtained or create a risk of fire or explosion. The grain material exiting from oil separation extractor 450 can be further processed into food and feed products as previously described.

Oil/solvent components collected from grain materials or from grain-based food products using the suction tubes and vacuum collection system, as appropriate, can be further processed to provide oil products containing various amounts of saturated and unsaturated constituents, as previously described. When the oil is removed from a grain product, this oil can be separated from the extraction solvent using known distillation techniques and can be recycled back into the original preparation process for the grain product.

The amount of oil to be extracted from a grain material depends on the products to be produced from the grain material. Since the extracted grain material, Marc, is subsequently processed into food and feed products, it may be desirable to leave a particular minimum oil content in the Marc. Applicants have easily reduced the oil content of rice bran from about 20 percent by weight to less than 1 percent by weight in a laboratory apparatus, using counter-current solvent extraction with ethyl acetate vapor. The amount of oil extracted depends on the contact time between the grain material surface and the solvent vapor, the concentration of oil in the vapor which is in contact with the grain material surface (overall volume of vapor per volume of grain material used during the stripping operation), the temperature, and the pressure during the solvent extraction operation. Applicants observed, during rice bran processing that a grain material contact time (residence time in a stripping apparatus column) with ethyl acetate vapor, at about 180° F., ranging from about 30 seconds to about one minute, at a partial pressure ranging from atmospheric at the column base to about 0.1 in. Hg at the top of the stripping apparatus column, when the weight of solvent to weight of rice bran utilized is approximately 3 to 1, reduces the rice bran oil content from about 21 percent by weight to about 1 percent by weight. To preserve the stripping apparatus column vacuum, air locks were used at the top and the bottom of the stripping column.

One skilled in the art can devise other schemes for contacting the grain product with the solvent vapors, to obtain oil extraction. There are numerous kinds of equipment which can be used for this purpose. The critical features are: 1) that the grain material, flaked vegetable matter or grain-based food product provide sufficient extraction surface from which the oil can be removed; 2) that the proper solvent be used and that at least the initial contact between grain material and solvent be made with the solvent in vapor form; 3) that the temperature during the solvent extraction be maintained as low as possible (typically less than 210° F.) to avoid degradation of the oils and proteins within the grain material; 4) that a sufficient amount of solvent be used that the concentration of oil in the extraction solvent vapors at the grain material surface be sufficiently low to have a driving force for migration of the oil from the grain material into the solvent vapor (typically this is assisted by the use of counter-current flow between the solvent and the grain material); and, 5) that in view of these factors, the contact time between the solvent vapors and the grain material be sufficient to permit the desired amount of extraction of oil from the grain material.

The preferred solvent for use in stripping the oil from the grain material is one which forms a weak bond with the oil molecules; this weak bond permits separation processes whereby the oil is removed from the grain material and whereby a saturated oil/solvent fraction can be separated from an unsaturated oil/solvent fraction, but is weak enough that when a moderate amount of energy is applied, the solvent can be separated from the oil. Typically this latter separation is achieved using a distillation process. Applicants have discovered that solvents such as an acetate or an alcohol or similar molecular structure capable of forming a hydrogen bond with the oil molecule can perform well as an oil stripping solvent. Preferred solvents are, for example, methyl acetate, ethyl acetate, methanol, ethanol, isopropyl alcohol, hexyl alcohol, dexyl alcohol, or dectyl alcohol. Such solvents can be used alone or in combination. The most preferred of these solvents are those which are already approved by the Food and Drug Administration. One skilled in the art can, with minimum experimentation, determine which of these solvents is optimum for use in combination with a particular grain material. Applicants have determined that ethyl acetate works particularly well with rice bran, for example.

After the oil has been stripped from the grain material, the resulting Marc is separated from the solvent, which solvent is then recycled into the stripping process. Typically the solvent is removed using a rotary drum dryer operated at a low temperature, preferably under the assist of a partial vacuum, which enables solvent removal at a lower temperature. Such solvent removal processes are well known within the food processing industry.

The oil/solvent composition obtained from the stripping operation can be distilled to separate the various oil constituents from the solvent; however, complete breakdown to individual oil constituents is not generally necessary. The oil comprises a variety of molecular structures having various degrees of saturation. It is well known that the saturated fats contained in this oil fraction have undesirable effects on human health when allowed to accumulate in the body over an extended time span. Therefore, it would be highly desirable to provide an oil composition from which a large portion of these saturated fats (oils) have been removed. Applicants have discovered an economical method of processing the oil composition obtained from the above-described stripping operation to produce an oil fraction substantially reduced in saturated oil content.

FIG. 5 shows a schematic of a preferred process wherein the oil/solvent composition obtained from a grain material oil extraction operation is processed through a separation apparatus wherein the lighter oils, comprising principally saturated oils and waxes are separated from the heavier oils, comprising principally unsaturated oils and fatty acids. With reference to FIG. 5, the extracted grain oil/solvent composition is fed to an apparatus which utilizes gravity flow of the composition components combined with variable vacuum in a multi-chamber process vessel in step 510, to separate a principally saturated oils and waxes/solvent fraction 512 from a principally unsaturated oils and fatty acids/solvent fraction 516. The lighter fraction 512, comprising principally saturated oils, can then be separated in step 514 (typically via distillation under partial vacuum) to provide a saturated oil and wax product as well as a fatty acid product and a solvent for recycle into the solvent extraction step 112 shown in FIG. 1. The heavier fraction 516, comprising principally unsaturated oils and fatty acids, can then be separated in step 518 (typically by distillation under partial vacuum) to provide a principally unsaturated oils product and a fatty acids/solvent composition. This latter composition can be further separated in step 520 (via distillation) to provide a fatty acid product and solvent for recycling to the oil extraction operation.

FIG. 6 shows two preferred embodiments of an apparatus which can be used to achieve the separation of extracted oil/solvent components as shown at 118 in FIG. 1. With reference to FIG. 6, separation is achieved in process vessel 600 having five chambers in which various steps of the separation process take place. The extracted oil/solvent composition enters through a feed line 602 into a central feed inlet chamber 604 of vessel 600. Feed inlet chamber 604 may be simply an open housing or may contain baffles (not shown) to direct the flow of the extracted oil/solvent composition feed. The feed rate into feed inlet chamber 604 can be constant or can be pulsed, that is periodic. The feed may enter through a spray nozzle (not shown), through a control valve (not shown) or simply through a pipeline. The pulsed feed can be achieved using a pump or a control valve set to produce a periodic supply of the feed, or can be achieved by periodic application of the vacuum source used to create the desired vacuum profile within the apparatus. A pulsed feed rate to feed inlet chamber 604 has been shown to provide significantly improved separation over the separation obtained using a constant feed flow.

The lighter oil/solvent fraction of the extracted oil/solvent composition feed, drawn by a partial vacuum applied at the top 624 of vessel 600 moves upward past retainer screen 616A (used to retain packing 612) into chamber 606 which is filled with a packing 612. Packing 612 can be any inert packing known within the chemical industry. One inert packing which has been observed to work particularly well is a ceramic interlock saddle type of packing.

The lighter oil/solvent fraction, which comprises principally saturated oil and waxes in combination with solvent, then passes through retainer screen 616B, and enters chamber 628 which is typically open, but which can contain baffles (not shown) to direct the flow of the lighter oil/solvent fraction. The lighter oil/solvent fraction, principally comprising saturated oils and waxes in combination with solvent, can then processed (apparatus not shown) to separate the oils and waxes from the solvent, as previously described.

The heavier oil/solvent fraction, which comprises principally unsaturated oil and fatty acids in combination with solvent, is pulled via gravity from central feed inlet chamber 604 downward through packing retaining screen 618A into chamber 608 which is also filled with a packing 614, further downward through retainer screen 618B, through typically open area 630, and exits at the bottom 626 of vessel 600. Packing 614 can be any inert packing of the kind used in the chemical industry to accomplish separations. Packing 614 can be the same as or different from packing 612.

The heavier oil/solvent fraction having passed through retainer screen 618B enters chamber 630 which is typically open, but which can contain baffles (not shown) to direct the flow of the heavier oil/solvent fraction to the vessel exit 626. The heavier oil/solvent fraction, principally comprising unsaturated oils and fatty acids in combination with solvent can then be further processed as previously described.

Not all of the separation of the light oil/solvent fraction from the heavy oil/solvent fraction occurs in fed inlet chamber 604. There is a migration of a portion of heavy oil/solvent fraction into chamber 606 and a migration of a portion of light oil/solvent fraction into chamber 608. These packed chambers are used to further accomplish separation, with the lighter oil components eventually working their way toward the top of vessel 600 and exiting at the top 624 through a take off line (not shown) and the heavier oil components eventually working their way toward the bottom of vessel 600 and exiting at 626. However, a surprising amount of separation of the fraction comprising the light oil from the fraction comprising the heavy oil occurs in centrally located feed inlet chamber 604. The extracted oil/solvent composition feed enters feed inlet chamber 604 as a vapor or is converted to a vapor immediately upon entrance to feed inlet chamber 604 due to the partial vacuum applied to the upper portion of chamber 628 through the top 624 of vessel 600. Presence of a relatively open compartment 604 in the central area of vessel 600 permits a free exchange of vapor and prevents condensation of the vapor which could otherwise occur due to back pressures developed within other portions of vessel 600. Once the oil/solvent composition vapor enters feed inlet chamber 604, the vapor cam move up or down or sit at equilibrium. Gravity forces the heavier molecules to fall downward and either heat or pressure or a combination thereof forces the lighter molecules to move upward in vessel 600. Use of the pulsed flow of the extracted oil/solvent composition feed to feed inlet chamber 604 permits the molecules to sort out better by permitting the vacuum in feed inlet chamber 604 to build up, assisting in the gravimetric separation by avoiding creation of a back pressure in chamber 606. The longer the pulse interval, the more saturated oils will exit 624 at the top of vessel 600. The shorter the pulse interval, the more saturated oils will exit 626 at the bottom of vessel 600. The pulse length can be adjusted with minimal experimentation to provide the desired product stream at exits 624 and 626.

Additional solvent (preferably the same solvent as that used in the solvent extraction process described with reference to FIG. 1) can be introduced into vessel 600 to further facilitate the separation process. This additional solvent is typically added in vapor form near the bottom of vessel 600 to further facilitate the separation process. This additional solvent is typically added in vapor form near the bottom of vessel 600 at inlet 610 into chamber 630. This solvent addition can be at a constant rate or can be pulsed in the manner described for the extracted oil/solvent feed stream.

Figure 6A:
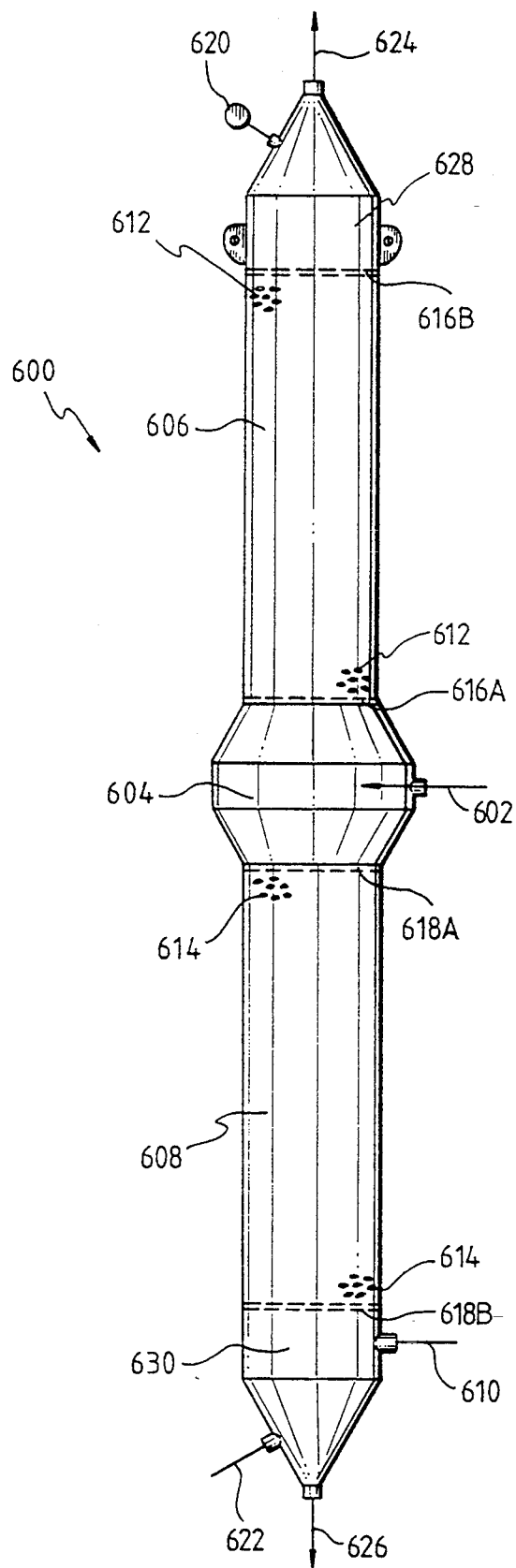
FIGS. 6A and 6B show schematics of preferred embodiments of an apparatus for separation of the extracted oil/solvent composition into particular oil/solvent fractions.
Figure 6B:
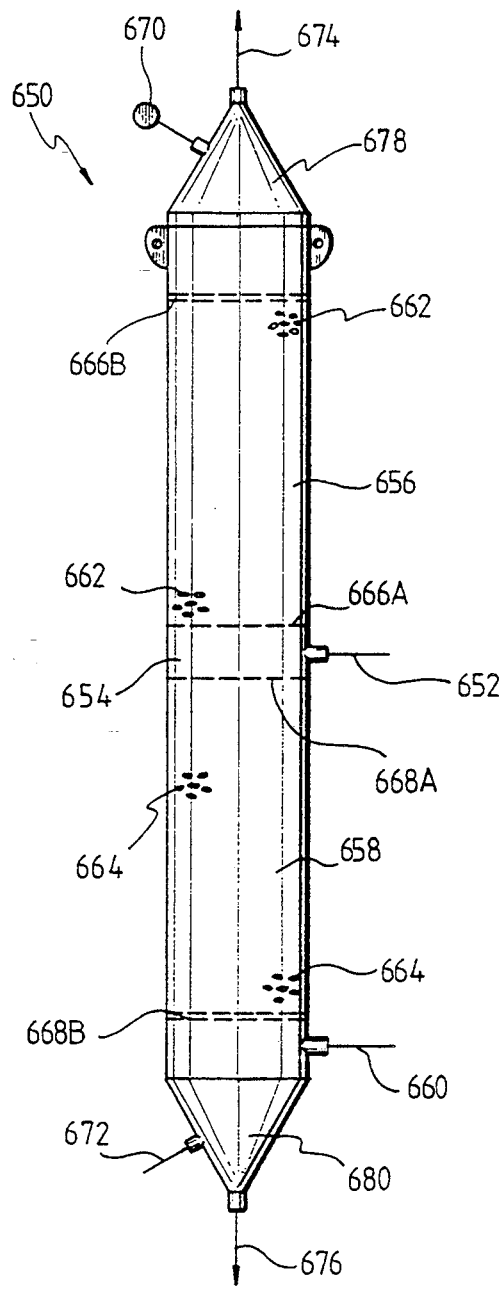

FIG. 6B illustrates a less preferred embodiment of the separation apparatus, wherein the central open chamber is not expanded as it is in FIG. 6A. The extracted oil/solvent feed enters separation vessel 650 through entry 652 to central feed inlet chamber 654 which may contain baffles (not shown) for directing the feed, as previously described with reference to FIG. 6A. The lighter oil/solvent components of the feed tend to migrate upward through retaining screen 666A, and through chamber 656 which contains packing 662. Due to the partial vacuum applied through the top 674 of chamber 678, the lighter oil/solvent fraction continues in upward travel through retaining screen 666B, through relatively open chamber 678 (which may contain baffles, as previously described), and out the top 674. The heavier oil/solvent components of the feed tend to migrate downward through retaining screen 668A, and through chamber 658 which contains packing 664. Due to gravitational forces, the heavier oil/solvent fraction progresses downward through retaining screen 668B into relatively open chamber 680 (which may contain baffles) and exits through the bottom 676 of chamber 680.

The temperature and pressure conditions which are utilized within the separation chamber, the kind of packing, and the length of feed pulse (or vacuum pulse) will depend on the composition of the feed stream to be separated.

As previously described with reference to FIG. 6A, additional solvent can be added through inlet 660 into relatively open area 680. Open area 680 may contain solvent vapor directing baffles if desired. One skilled in the art, with in view of the disclosure provided herein, can develop the conditions which provide optimum processing of the extracted oil/solvent feed with minimal effort.

Example 1 below provides a detailed description of the separation of an extracted oil/solvent composition feed obtained from rice bran into a principally saturated oils and waxes fraction and a principally unsaturated oils and fatty acids fraction.

EXAMPLE 1

This example discloses a preferred embodiment of the method of separating an extracted rice bran oil/ethyl acetate solvent composition into a principally saturated oil fraction, a principally unsaturated oil fraction, a fatty acids fraction and an ethyl acetate fraction.

An extracted oil/solvent composition in liquid form comprising about 25 percent extracted rice bran oil and about 75 percent ethyl acetate was continually fed to a separation apparatus using a pulsed flow rate. The overall flow rate was about 250 g. per minute. The pulsed feed was obtained using a control valve which permitted flow of composition to the separation apparatus for a period of about 10 seconds, followed by absence of flow for about 2 minutes, with this cycle repeating during operation of the separation apparatus. The separation apparatus consisted of a glass tube and valve assembly having an inside diameter of about 2 inches, which was about 27½ inches long. The feed composition entered a valve into a central first volumetric area about 1½ inches in length which was essentially open (unpacked). This central volume area was under a vacuum such that an absolute pressure ranging from about 3 in. Hg to about 25 in. Hg was present therein. The entering liquid feed, at a temperature of about 190° F., volatilized upon entry into the open valve area. The volatilized oil/solvent feed composition immediately began to separate.

A principally saturated oil/solvent fraction progressed upward toward a second volumetric area of the glass tube which was filled with 3/8 in. stainless steel porous saddles as packing. This second volumetric area was about 12 inches in length and at an absolute pressure ranging between about 3 in. Hg and about 25 in. Hg. At the top of the packed second volumetric area was a fourth volumetric area which was open (about 1 in. in length). The volatilized saturated oil/solvent fraction was removed from this open area and subsequently condensed.

A principally unsaturated oil/solvent fraction progressed downward into a third volumetric area of the glass tube which was also filled with ⅜ in. stainless steel porous saddles as packing. This third volumetric area was also about 12 inches in length. The absolute pressure in the upper portion of this third volumetric area ranged between about 5 in. Hg and about 25 in. Hg increasing to atmospheric pressure at the bottom of the third volumetric area. At the bottom of the packed third volumetric area was a fifth volumetric area which was open (about 1 in. in length). The volatilized unsaturated oil/solvent component was removed from this open area and subsequently condensed.

No heat was added to the separation apparatus other than the heat from the extracted rice bran oil/solvent composition.

Approximately 20 percent by weight of the original extracted rice bran oil/solvent composition feed was collected from the top of the apparatus as principally saturated oil/ethyl acetate fraction and approximately 80 percent by weight of the feed composition was collected from the bottom of the apparatus as principally unsaturated oil/ethyl acetate fraction.

Each fraction collected was subsequently condensed and stored for future processing.

The condensed components were then heated in a rotating evaporator operated at an absolute pressure of about 0.5 in. Hg. The rotating evaporator was heated by an oil bath. The ethyl acetate solvent was thereby removed from the saturated or unsaturated oil (desolventizing).

EXAMPLE 2

This example discloses a preferred embodiment of the method of extracting the oil contained in rice bran, using an ethyl acetate solvent which is in vapor form at the time it initially contacts the rice bran.

Rice bran, 24 hrs. after milling, was processed through an oil stripping apparatus. The composition of the rice bran was as follows:

| Rice Bran Starting Material | |
| --- | --- |
| Component | Weight Percent |
| Carbohydrates | 46.0 |
| Moisture | 9.1 |
| Protein | 10.1 |
| Fat | 12.3 |
| Fiber | 16.6 |
| Ash | 5.7 |

The rice bran sieve was such that about 81% of the bran remained on top of a U.S.S. #80 mesh screen, with about 19% passing through the screen. Approximately 400 g. of the rice bran, at room temperature, was placed in a 500 ml. glass separatory vacuum funnel having a valved bypass loop. About 750 ml. of ethyl acetate stripping solvent vapor at a temperature of about 175° F. was pulled upward through the rice bran using a vacuum. The flow rate of the ethyl acetate through the rice bran was approximately 20 ml. per minute. The ethyl acetate formed a weak bond with oil contained in the rice bran and this oil was carried out of the vacuum funnel with the ethyl acetate vapors passing through the rice bran.

The vacuum source used to pull the ethyl acetate vapor through the rice bran was a 2 gallon mechanical aspirator manufactured by Cole-Parmer. This vacuum source was attached to a 200 mi. Liebig condenser which was attached to a 1,000 ml. flask into which the extracted oil/ethyl acetate composition was collected after exiting the 500 ml. glass separatory vacuum funnel. Typically the amount of vacuum applied was such that the absolute pressure at the top of the 500 ml. glass separatory vacuum funnel was about 3 in. Hg. The dew point of the extracted oil/ethyl acetate composition was 67° F. and the condenser was operated at a temperature of about 40° F.

No heat other than the heat from the 175° F. ethyl acetate stripping solvent vapor was added to the extraction process.

The extracted oil/ethyl acetate composition contained about 14% by weight extracted rice bran oil, with the rice oil having the following composition:

| Carbons in Molecule: Double Bonds Present | Fatty Acid Name | Weight Percent | Form |
| --- | --- | --- | --- |
| C10 | Capric | 0.0 | Saturated |
| C11 | Undecanoic | 0.0 | Saturated |
| C12 | Lauric | 0.0 | Saturated |
| C14 | Myristic | 0.93 | Saturated |
| C14:1 | Myristoleic | 0.0 | Monounsaturated |
| C15 | Pentadecanoic | 0.0 | Monounsaturated |
| C16 | Palmitic | 17.32 | Saturated |
| C16:1 | Palmitoleic | 0.0 | Monounsaturated |
| C18 | Stearic | 2.45 | Saturated |
| C18:1 | Oleic | 44.74 | Monounsaturated |

-continued

| Carbons in Molecule: Double Bonds Present | Fatty Acid Name | Weight Percent | Form |
| --- | --- | --- | --- |
| C18:2 | Linoleic | 30.07 | Polyunsaturated |
| C18:3 | Linolenic | 0.98 | Polyunsaturated |
| C19 | Nonadecanoic | 0.68 | Saturated |
| C20 | Arachidic | 0.44 | Saturated |
| C20:1 | Gadoleic | 0.67 | Monounsaturated |
| C21 | Heneicosanoic | 0.0 | Saturated |
| C22 | Behnic | 0.0 | Saturated |
| C24 | Lignoceric | 1.73 | Saturated |
| Total Saturated: | | 23.55 | |
| Total Monounsaturated: | | 45.41 | |
| Total Polyunsaturated: | | 31.04 | |

By comparison, rice oil extracted from the same rice bran starting material, but extracted using liquid hexane in a soxhlet extractor had the following composition:

| Carbons in Molecule: Double Bonds Present | Fatty Acid Name | Weight Percent | Form |
| --- | --- | --- | --- |
| C14 | Myristic | 0.289 | Saturated |
| C16 | Palmitic | 16.713 | Saturated |
| C18 | Stearic | 1.823 | Saturated |
| C18:1 | Oleic | 42.183 | Monounsaturated |
| C18:2 | Linoleic | 36.739 | Polyunsaturated |
| C18:3 | Linolenic | 1.379 | Polyunsaturated |
| C19 | Nonadecanoic | 0.28 | Saturated |
| C20 | Arachidic | 0.595 | Saturated |
| C21 | Gadoleic | 0.0 | Saturated |
| C24 | Lignoceric | 0.0 | Saturated |

A comparison of the rice oil extracted by the method of the present invention with the rice oil extracted using liquid hexane as the extraction solvent shows that the overall extraction of saturated oils is slightly higher (possibly within experimental error) for the ethyl acetate vapor extraction than for extraction using liquid hexane as the solvent.

The composition of the Extracted Rice Bran after oil extraction using ethyl acetate vapor as the extraction solvent was as follows:

| Component | Weight Percent |
| --- | --- |
| Carbohydrates | 43.2 |
| Moisture | 9.0 |
| Protein | 14.5 |
| Fat | 2.7 |
| Fiber | 22.5 |
| Ash | 8.0 |

EXAMPLE 3

This example discloses a preferred embodiment of the method of increasing the porosity of rice bran in preparation for the extraction of oil therefrom.

Approximately 400 g. of rice bran previously described, less than 24 hrs. after milling, was placed in a plastic container and covered with water and allowed to stand at room temperature for about 12 hrs. The rice bran became saturated with water such that the moisture content was about 17 percent by weight.

This saturated rice bran was placed in a 500 ml. glass separatory vacuum funnel wrapped with electric heating tape. The funnel was heated until the temperature of the rice bran was raised to about 215° F. under the pressure generated internally (that is, the funnel was closed to ambient atmosphere).

The 215° F. rice bran was then dropped through a valve at the bottom of the 500 ml. separatory vacuum funnel into a 1,000 ml. glass retort which was at an absolute pressure of about 3 in. Hg. The retort was maintained at this partial vacuum using a 2 gal. mechanical aspirator pump manufactured by Cole-Parmer.

The rice bran expanded upon entering the glass retort such that the volume of the rice bran increased at least twice. This expansion produced porosity which enabled subsequent extraction of the oil contained in the rice bran.

The preferred embodiments of the present invention, as described above and shown in the Figures are not intended to limit the scope of the present invention, as demonstrated by the claims which follow, since one skilled in the art can, with minimal experimentation, extend the scope of the embodiments to match that of the claims.

What is claimed is:

1. A method for extracting oil from oil-bearing grain materials or grain products which comprises:

preparing a vapor of a solvent for the oil which is not a solvent for protein in the grain materials or grain products;

introducing the vapor into a container below a horizontal bed of oil-bearing grain material or grain product from which substantially no oil has been extracted while the bed of rice bran is being moved horizontally;

passing the vapor through a horizontally moving bed of oil-bearing grain material or grain product so that the vapor contacts the grain material;

the pressure and temperature of the vapor and the grain material or grain product being such that at least a portion of the vapor condenses upon contact with the grain material and extracts oil from the grain material or grain product, forming a solvent/oil solution and a marc from which oil has been extracted; and thereafter, while continuing to move the bed of grain material or grain product horizontally, passing a gas downwardly through the bed of grain material or grain product at a velocity sufficient to substantially separate the solution from the grain material or grain product.

2. A method as defined by claim 1 wherein the solvent vapor is drawn through the grain material or grain product by a partial vacuum.

3. A method for extracting oil from rice bran which comprises:

preparing a vapor of methyl acetate or ethyl acetate;

introducing the vapor into a container below a horizontal bed of rice bran from which substantially no oil has been extracted while the bed of rice bran is being moved horizontally;

passing the vapor through the moving bed of rice bran so that the vapor contacts the rice bran;

the pressure and temperature of the vapor and the rice bran being such that at least a portion of the vapor condenses upon contact with the rice bran and extracts oil from the rice bran, forming a solvent/oil solution and a marc. from which oil has been extracted, while maintaining a temperature in the bed of not more than about 210° F.; and thereafter, while continuing to move the bed of marc and solvent/oil solution horizontally, passing a gas downwardly through the bed at a velocity sufficient to separate at least some of the solution from the marc.

4. A method as defined by claim 3 in which the ethyl acetate vapor is under a partial vacuum when it comes into contact with the rice bran and some of the ethyl acetate remains in vapor form after it passes through the bed of rice bran.

* * * * *